(12) United States Patent
Gormish et al.

(10) Patent No.: US 9,911,213 B2
(45) Date of Patent: Mar. 6, 2018

(54) PANORAMIC IMAGE STITCHING USING OBJECTS

(71) Applicants: Michael Gormish, Menlo Park, CA (US); Edward Schwartz, Menlo Park, CA (US)

(72) Inventors: Michael Gormish, Menlo Park, CA (US); Edward Schwartz, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 138 days.

(21) Appl. No.: 14/975,635

(22) Filed: Dec. 18, 2015

(65) Prior Publication Data

US 2017/0178372 A1 Jun. 22, 2017

(51) Int. Cl.
*G06K 9/00* (2006.01)
*G06T 11/60* (2006.01)
*G06K 9/46* (2006.01)
*G06K 9/62* (2006.01)
*G06T 7/00* (2017.01)

(52) U.S. Cl.
CPC ............ *G06T 11/60* (2013.01); *G06K 9/4609* (2013.01); *G06K 9/6215* (2013.01); *G06K 9/6267* (2013.01); *G06T 7/0042* (2013.01); *G06K 2009/4666* (2013.01); *G06T 2207/10016* (2013.01); *G06T 2207/10024* (2013.01); *G06T 2207/20221* (2013.01)

(58) Field of Classification Search
CPC . G06T 3/4038; G06T 2200/32; G06T 7/0028; G06T 2207/10016; G06T 7/0024; G06T 5/50; G06T 7/0042; G06T 7/0097; G06T 7/0038; H04N 5/23238; H04N 1/3876; H04N 2013/0088; G06K 2009/2045; G06K 9/6211
See application file for complete search history.

(56) References Cited

U.S. PATENT DOCUMENTS 7,953,299 B2 5/2011 Shiiyama
8,818,101 B1 * 8/2014 Lim ..................... G06K 9/6203
345/629

(Continued)

FOREIGN PATENT DOCUMENTS

WO WO2015086537 6/2015

OTHER PUBLICATIONS

Kwatra, Vivek et al; "Graphcut Textures: Image and Video Synthesis Using Graph Cuts"; found at http://www.cc.gatech.edu/cpl/projects/graphcuttextures; dated 2003; 10 pages; GVU Center / College of Computing Georgia Institute of Technology.

(Continued)

*Primary Examiner* — Li Liu
(74) *Attorney, Agent, or Firm* — Patent Law Works LLP

(57) ABSTRACT

A system and method that determines a seam between pairs of adjacent images for panoramic image stitching is disclosed. The method includes receiving a sequence of images, determining a pair of adjacent images in the sequence of images, matching one or more objects corresponding to a same object identifier in the pair of adjacent images, determining a seam in an overlap region between the pair of adjacent images and determining a portion of pixels from each image of the pair of adjacent images to represent in a stitched panoramic image based on the seam.

20 Claims, 13 Drawing Sheets

(56) References Cited

U.S. PATENT DOCUMENTS

| | | | |
|---|---|---|---|
| 2003/0083850 | A1 | 5/2003 | Schmidt et al. |
| 2003/0103683 | A1* | 6/2003 | Horie .................... G06T 7/0024 382/284 |
| 2006/0013463 | A1 | 1/2006 | Ramsay et al. |
| 2008/0089615 | A1 | 4/2008 | Shiiyama |
| 2008/0253685 | A1* | 10/2008 | Kuranov ............... G06T 3/4038 382/284 |
| 2010/0194851 | A1* | 8/2010 | Pasupaleti ............ H04N 1/3876 348/36 |
| 2011/0102542 | A1* | 5/2011 | Chen ..................... G06T 3/4038 348/37 |
| 2012/0243737 | A1 | 9/2012 | Ogawa |
| 2013/0287304 | A1* | 10/2013 | Kimura ................. G06T 7/0028 382/199 |
| 2013/0329002 | A1* | 12/2013 | Tico ...................... G06T 3/4038 348/36 |
| 2014/0118479 | A1* | 5/2014 | Rapoport ........... H04N 1/00183 348/36 |
| 2015/0138309 | A1* | 5/2015 | Seok ................... H04N 5/23238 348/36 |
| 2015/0248584 | A1* | 9/2015 | Greveson ........... G06K 9/00476 382/113 |
| 2016/0048973 | A1* | 2/2016 | Takenaka .............. G06T 3/4038 382/199 |
| 2016/0050368 | A1* | 2/2016 | Seo .................... H04N 5/23238 348/36 |
| 2016/0063705 | A1* | 3/2016 | Xu ........................... G06T 5/50 382/199 |

OTHER PUBLICATIONS

F. Pitie, et al; "N-Dimensional Probability Density Function Transfer and its Application to Colour Transfer"; dated 2005; 6 pages; University of Dublin, trinity College Dublin 2, Ireland.

Matthew Brown and David G. Lowe "Automatic Panoramic Image Stitching Using Invariant Features"; dated Dec. 2006; 15 pages; International Journal of Computer Vision 74(1).

Francois Pitie, et al.; "Automated Colour Grading Using Colour Distribution Transfer"; dated 2007; 15 pages; Trinity College Dublin, 2 College Green, Dublin, Ireland.

F. Pitie, A. Kokaram "The Linear Monge-Kantorovitch Linear Colour Mapping for Example-Based Colour Transfer"; dated 2007; 9 pages; sigmedia.tv, Trinity College Dublin, Ireland.

Jorge Moraleda and Jonathan J. Hull; "Toward Massive Scalability in Image Matching"; dated 2010; 4 pages; 2010 International Conference on Pattern Recognition.

Mazin, Baptiste, et al "Combining Color and Geometry for Local Image Matching" dated Nov. 11-15, 2012; 4 pages; 21st International Conference on Pattern Recognition (ICPR 2012), Tsukuba, Japan.

Nicolas Bonneel, et al. "Example-Based Video Color Grading" dated 2013; 11 pages.

Gormish, Michael; "Stitching Software for Ocutag Retail Execution (ORE)", dated Oct. 12, 2015; 15 pages.

Ramya Narasimha, et al. "Colour-Based Post-Processing of RVS Image Matching Results for ORE Product Disambiguation" dated Oct. 21, 2015, 18 pages.

* cited by examiner

PANORAMIC IMAGE STITCHING USING OBJECTS

BACKGROUND

Field of the Invention

The specification generally relates to panoramic stitching based on a sequence of images using objects. In particular, the specification relates to a system and method for matching pairs of adjacent images in the sequence of images, matching corresponding objects in adjacent images, and determining a relationship between all the images and objects.

Description of the Background Art

A planogram is a visual representation of products in a retail environment. For example, a planogram may describe where in the retail environment and in what quantity products should be located. Such planograms are known to be effective tools for increasing sales, managing inventory and otherwise ensuring that the desired quantity and sizes of an item are placed to optimize profits or other parameters. However, presentation and maintenance of adequate levels of stock on shelves, racks and display stands is a labor-intensive effort, thereby making enforcement of planograms difficult. While the location and quantity of products in retail stores can be manually tracked by a user, attempts are being made to automatically recognize the products and automatically or semi-automatically obtain information about the state of products.

Previous attempts at recognizing products have deficiencies. For example, one method to achieve the goal of recognizing multiple products from multiple images is through image stitching. Unfortunately, existing image stitching techniques can lead to artifacts including misalignment and can interfere with the optimal operation of recognition.

SUMMARY

The techniques introduced herein overcome the deficiencies and limitations of the prior art, at least in part, with a system and method for determining a relationship between multiple images and multiple objects for panoramic image stitching. In one embodiment, the system includes a stitching application. The stitching application receives a sequence of images of a scene. The stitching application further determines pairs of adjacent images in the sequence of images. In the pairs of adjacent images, the stitching application matches one or more objects corresponding to a same object identifier. Finally, the stitching application determines a relationship between the images in the sequence of images and the objects in the images.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
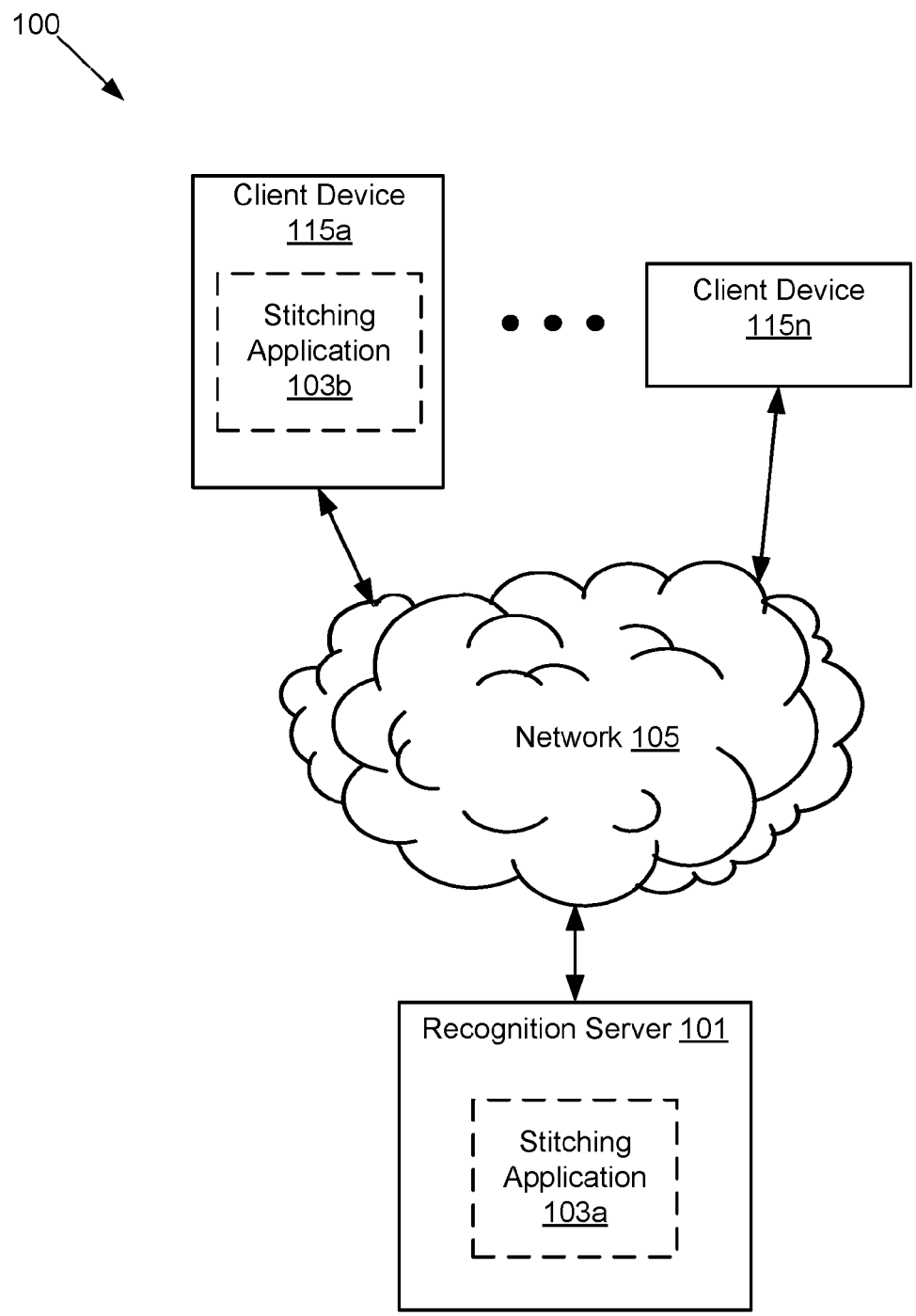
FIG. 1 is a high-level block diagram illustrating one embodiment of a system for determining a seam between multiple pairs of adjacent images for panoramic image stitching.

FIG. 1 is a high-level block diagram illustrating one embodiment of a system 100 for processing multiple pairs of adjacent images for panoramic image stitching using objects. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement a stitching application 103a described in more detail below. In one embodiment, the recognition server 101 provides services to a consumer packaged goods firm for identifying products on shelves, racks, or displays and determining a structured way to arrange a placement of the products. While the examples herein describe recognition of products in an image of shelves, such as a retail display, it should be understood that the image may include any arrangement of organized objects. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc. For purposes of this application, the terms "item," "object" and "product" are used interchangeably to mean the same thing, namely, a material thing that can be seen and/or touched.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a website or an email, or an image from any other source. Although only a single recognition server 101 is shown in FIG. 1, it should be understood that there may be any number of recognition servers 101 or a server cluster. The recognition server 101 may include data storage 243.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a query image to the recognition server 101 and the recognition server 101 provides data in JavaScript Object Notation (JSON) format about one or more items recognized in the query image to the client device 115. The client device 115 may support use of graphical application program interface (API) such as Metal on Apple iOS™ or RenderScript on Android™ for determination of feature location and feature descriptors during image processing.

The stitching application 103 may include software and/or logic to provide the functionality for stitching a sequence of images. In some embodiments, the stitching application 103b may be a thin-client application with some functionality executed on the client device 115 and additional functionality executed on the recognition server 101 by stitching application 103a. For example, the stitching application 103b on the client device 115 could include software and/or logic for capturing an image, transmitting the image to the recognition server 101, and displaying image recognition results. In another example, the stitching application 103a on the recognition server 101 could include software and/or logic for receiving the image, stitching the image into a larger composite image based on sufficient overlap with a previously received image and generating image recognition results. The stitching application 103a or 103b may include further functionality described herein, such as processing the image and performing feature identification.

In some embodiments, the stitching application 103 receives a sequence of images of a scene. For example, the scene may include at least a portion of a shelving unit, a region, an artwork, a landmark, a scenic location, outer space, etc. The stitching application 103 determines a pair of adjacent images in the sequence of images. The stitching application 103 matches one or more objects corresponding to a same object identifier in the pair of adjacent images based on object recognition information. The stitching application 103 determines a seam in the overlap region between the pair of adjacent images. The stitching application 103 determines a portion from each image of the pair of adjacent images to represent in a stitched panoramic image based on the seam. The operation of the stitching application 103 and the functions listed above are described below in more detail below with reference to FIGS. 3-5.

Figure 2:
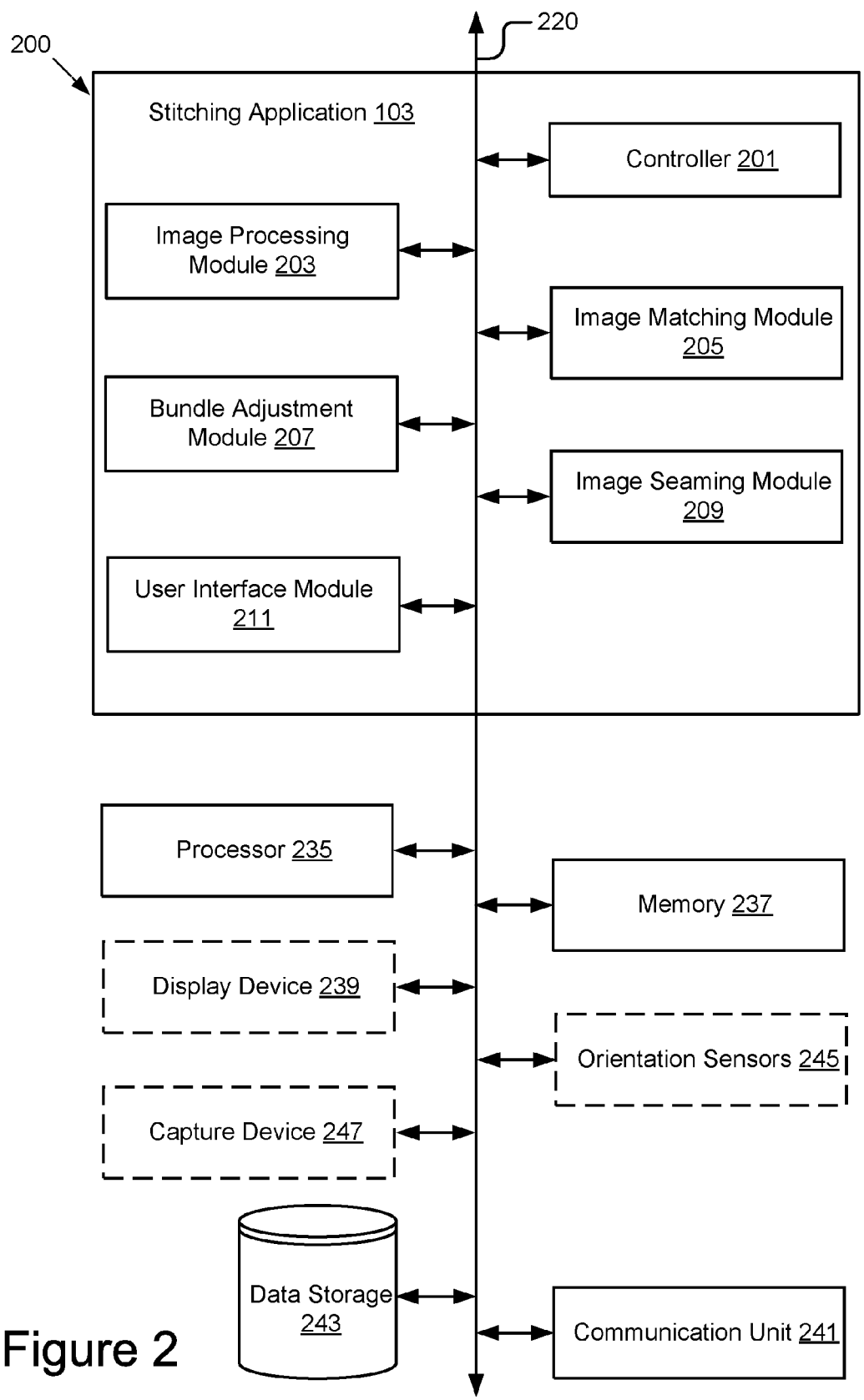
FIG. 2 is a block diagram illustrating one embodiment of a computing device including a stitching application.

FIG. 2 is a block diagram illustrating one embodiment of a computing device 200 including a stitching application 103. The computing device 200 may also include a processor 235, a memory 237, an optional display device 239, a communication unit 241, data storage 243, optional orientation sensors 245, and an optional capture device 247 according to some examples. The components of the computing device 200 are communicatively coupled by a bus or software communication mechanism 220. The bus or software communication mechanism 220 may represent one or more buses including an industry standard architecture (ISA) bus, a peripheral component interconnect (PCI) bus, a universal serial bus (USB), or some other bus or software communication mechanism known in the art to provide similar functionality. Additionally, the bus or software communication mechanism 220 may represent communication protocols and/or processes internal to a program (e.g., stitching application 103). In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described herein but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus or software communication mechanism 220 to access data and instructions therefrom and store data therein. The bus or software communication mechanism 220 may couple the processor 235 to the other components of the computing device 200 including, for example, the memory 237, the communication unit 241, the stitching application 103, and the data storage 243. It will be apparent to one skilled in the art that other processors, operating systems, sensors, displays and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the stitching application 103. The memory 237 is also capable of storing other instructions and data, including, for example, an operating system, hardware drivers, other software applications, databases, etc. The memory 237 may be coupled to the bus or software communication mechanism 220 for communication with the processor 235 and the other components of the computing device 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 may be a liquid crystal display (LCD), light emitting diode (LED) or any other similarly equipped display device, screen, or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus or software communication mechanism 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image or series of images. The communication unit 241 also transmits information including recognition results to the client device 115 for display, for example, in response to processing the image. The communication unit 241 is coupled to the bus or software communication mechanism 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus or software communication mechanism 220. The data storage 243 stores data for stitching and analyzing a series of received image and results of the analysis and other functionality as described herein. For example, the data storage 243 may store templates for a plurality of stock keeping units for image recognition purposes. A stock keeping unit (SKU) is a distinct item, such as a product offered for sale. The stock keeping unit includes all attributes that makes the item distinguishable as a distinct product from all other items. For example, the attributes include product identifier (Universal Product Code, International Article Number, etc.), product name, dimensions (width, height, depth, etc.), size (liters, gallons, ounces, pounds, kilograms, fluid ounces, etc.), description, brand manufacturer, color, packaging, material, model number, price, discount, base image, etc. The stock keeping unit may also refer to a unique identifier that refers to the particular product or service in the inventory. In some embodiments, the data storage 243 stores a received image and the set of features determined for the received image. The data storage 243 may similarly store one or more homographies determined for the received images. Additionally, the data storage 243 may store one or more planograms. The data stored in the data storage 243 is described below in more detail.

The orientation sensors 245 may be hardware-based or software-based, or a combination of hardware and software for determining position or motion of the computing device 200. In some embodiments, the orientation sensors 245 may include an accelerometer, a gyroscope, a proximity sensor, a geomagnetic field sensor, etc. In different embodiments, the orientation sensors 245 may provide acceleration force data for the three coordinate axes, rate of rotation data for the three coordinate axes (e.g., yaw, pitch and roll values), proximity data indicating a distance of an object, etc. It should be noted that the orientation sensors 245 are shown in FIG. 2 with dashed lines to indicate it is optional. For example, where the computing device 200 is the recognition server 101, the orientation sensors 245 are not part of the system, where the computing device 200 is the client device 115, the orientation sensors 245 are included and are used to provide sensor information for various motion or position determination events of the client device 200 described herein.

The capture device 247 may be operable to digitally capture an image or data of a scene. For example, the capture device 247 may be a high definition (HD) camera, a regular 2D camera, a multi-spectral camera, a structured light 3D camera, a time-of-flight 3D camera, a stereo camera, a standard smartphone camera or a wearable computing device. The capture device 247 is coupled to the bus or software communication mechanism to provide the images and other processed metadata to the processor 235, the memory 237 or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below with reference to FIGS. 3 and 5.

In some embodiments, the stitching application 103 may include a controller 201, an image processing module 203, an image matching module 205, a bundle adjustment module 207, an image seaming module 209 and a user interface module 211. The components of the stitching application 103 may be communicatively coupled via the bus or software communication mechanism 220. The components of the stitching application 103 may each include software and/or logic to provide their respective functionality. In some embodiments, the components of the stitching application 103 can each be implemented using programmable or specialized hardware including a field-programmable gate array (FPGA) or an application-specific integrated circuit (ASIC). In some embodiments, the components of the stitching application 103 can each be implemented using a combination of hardware and software executable by processor 235. In some embodiments, the components of the stitching application 103 may each be a set of instructions executable by the processor 235. In some embodiments, the components of the stitching application 103 may each be stored in the memory 237 and be accessible and executable by the processor 235. In some embodiments, the components of the stitching application 103 may each be adapted for cooperation and communication with the processor 235, the memory 237 and other components of the stitching application 103 via the bus or software communication mechanism 220.

The controller 201 may include software and/or logic to control the operation of the other components of the stitching application 103. The controller 201 controls the other components of the stitching application 103 to perform the methods described below with reference to FIGS. 6-9. The controller 201 may also include software and/or logic to provide the functionality for handling communications between the stitching application 103 and other components of the computing device 200 as well as between the components of the stitching application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 211 and sends the data to a client device 115, causing the client device 115 to present the user interface to the user.

In some embodiments, the controller 201 receives data from other components of the stitching application 103 and stores the data in the data storage 243. For example, the controller 201 receives data including features identified for an image from the image processing module 203 and stores the data in the data storage 243. In other embodiments, the controller 201 retrieves data from the data storage 243 and sends the data to other components of the stitching application 103. For example, the controller 201 retrieves data including a set of corresponding features for a pair of adjacent images from the data storage 243 and sends the retrieved data to the bundle adjustment module 207.

In some embodiments, the communications between the stitching application 103 and other components of the computing device 200 as well as between the components of the stitching application 103 can occur autonomously and independent of the controller 201.

The image processing module 203 may include software and/or logic to provide the functionality for receiving and processing one or more images of a scene from the client device 115. In some embodiments, the image processing module 203 receives one or more images of a portion of a shelving unit from the client device 115. In some embodiments, the image processing module 203 receives the images for recognition and the images may include multiple items of interest. For example, the image can be a realogram image of packaged products on a shelving unit (e.g., coffee packages, breakfast cereal boxes, soda bottles, etc.) which reflects the real situation on the shelves in a retail store. A packaged product of may include textual and pictorial information printed on its surface that distinguishes it from other packaged products. The packaged products may also sit in an orientation on the shelf exposed to the user looking at the shelf. For example, a box-like packaged product might be oriented with the front of the product exposed to the user looking at the shelf In some embodiments, the image processing module 203 determines whether successful recognition is likely on the received image and instructs the user interface module 211 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc.

Image size can have a significant impact on performance. Large images include more features giving way to more potential matches and this leads to potentially better stitching. However, large images lead to a higher number of features and substantially longer matching time (high computational cost). In some embodiments, the image processing module 203 reduces the resolution of the received images. For example, with retail scenes, larger images also lead to more false matches as more of the features focus on a relatively smaller spatial area and duplicate regions across packaged products become extremely likely to be matched. In one example, the image processing module 203 reduces the resolution to a range between 500,000 pixels to 600,000 pixels.

For purposes of creating a linear composite panoramic image using a series or sequence of images, the user may use a pattern of capture that enables image processing for the objects of interest (e.g., products). The user may move the client device 115 in any direction along the scene while remaining substantially parallel to the scene for capturing the series of images that adjacent to each other. For example, the user carrying the client device 115 can move in a north, south, east, or west direction from one point of location to another while remaining parallel to the shelving unit for capturing images in the series.

In some embodiments, the image processing module 203 receives a user selection of a pattern of image capture for capturing the series of images. The image processing module 203 instructs the user interface module 211 to provide guidance to the user via the client device 115 on how to capture a next image in the series of images based on the selected pattern of image capture. In some embodiments, the image processing module 203 receives the series of adjacent images overlapping with each other by a certain threshold. For example, an overlap threshold can be set at approximately 50-60 percent between adjacent images. The pattern of image capture, particularly the overlap, can assure that at least one image contains the entire visible (unobstructed) view of each objects (e.g., each product) in the scene, enabling image processing on those objects.

In one example, the selected pattern of image capture may be a serpentine scan pattern. In the serpentine scan pattern, the sequence of image capture may alternate between the top and the bottom (or between the left and the right) while the client device 115 is moving parallel to the scene in a horizontal direction (or a vertical direction). The image processing module 203 instructs the user interface module 211 to generate a user interface for guiding a movement of the client device 115 by the user based on the serpentine scan pattern. For example, the user interface may indicate that the client device 115 may move first down (or up) the scene, then to move to the right (or left) of the scene, then to move up (or down) the scene, then to move to the right (or left) of the scene, and again to move down (or up) the scene, in order to follow the serpentine scan pattern. The image processing module 203 receives an image of the scene captured by the client device 115 at the end of each movement.

In one example, the selected pattern of image capture may be a raster scan pattern. The raster scan pattern covers the image capture of the scene by moving the client device 115 progressively along the scene, one line at a time. The image processing module 203 instructs the user interface module 211 to generate a user interface for guiding a movement of the client device 115 by the user based on the raster scan pattern. For example, the user interface may indicate that the client device 115 may move from left-to-right (or right-to-left) of the scene in a line, then move down (or up) the scene at the end of line and start again from left-to-right (or right-to-left) of the scene in a next line, in order to follow the raster scan pattern. The image processing module 203 receives an image of the scene captured by the client device 115 at the end of each movement of the client device 115 from left-to-right (or right-to-left).

In one example, the selected pattern of image capture may be an over-and-back scan pattern. The over-and-back scan pattern covers the image capture of the scene by moving the client device 115 over a portion of the scene in a horizontal (or vertical) direction to one end and then moving the client device 115 back to capture another portion of the scene that was not covered. The image processing module 203 instructs the user interface module 211 to generate a user interface for guiding a movement of the client device 115 by the user based on the over-and-back scan pattern. For example, the user interface may indicate that the client device 115 may move from left-to-right (or right-to-left) of the scene to one end, then move down (or up) the scene, and to move from right-to-left (or left-to-right) back to the starting end, in order to follow the over and back scan pattern. The image processing module 203 receives an image of the scene captured by the client device 115 at the end of each movement of the client device 115 from left-to-right to one end and at the end of each movement of the client device 115 from right-to-left and back to the starting end.

In some embodiments, the image processing module 203 may process the one or more images serially or in parallel. The image processing module 203 determines a set of features (i.e., feature points) for the received image. For example, the image processing module 203 may determine a location, an orientation, and an image descriptor for each feature point identified in the received image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature finding and description algorithms for determining efficient image feature descriptors. For example, the features description algorithms may include Binary Robust Independent Elementary Features (BRIEF), Scale-Invariant Feature Transform (SIFT), Speeded Up Robust Features (SURF), Binary Robust Invariant Scalable Keypoints (BRISK) algorithm, Fast Retina Keypoint (FREAK) algorithm, Oriented FAST and Rotated BRIEF (ORB) algorithm, etc.

In some embodiments, the image processing module 203 matches the features of the received image with the features of templates stored for a plurality of items in the data storage 243 for image recognition. In some embodiments, the image processing module 203 identifies a region of interest (ROI) bordering each one of the items in the received image. A region of interest can be of any shape, for example, a polygon, a circle with a center point and a diameter, a rectangular shape of a width, a height and one or more reference points for the region (e.g., a center point, one or more corner points for the region), etc. For example, the region of interest may border the matched item in its entirety. In another example, the region of interest may border the exposed labeling containing pictorial and textual information associated with the matched item.

In some embodiments, the image processing module 203 sends the data including recognition results and associated regions of interest of the received images to the image matching module 205. In other embodiments, the image processing module 203 stores the data including recognition results and associated region of interests of the image of the shelving unit in the data storage 243.

The image matching module 205 may include software and/or logic to provide the functionality for matching each pair of adjacent images from a sequence of received images. In some embodiments, the image matching module 205 receives the sequence of images, recognition results for the items present in the images and associated regions of interest from the image processing module 203. In some embodiments, the image matching module 205 performs object based image matching between pairs of adjacent images from the sequence of received images. Rather than determining areas of pixels that are the same in two adjacent images, the image matching module 205 recognizes one or more objects in the pair of adjacent images that are the same (corresponding to a same object identifier) based on object based image matching and determines a relationship between the pair of adjacent images based on the recognized objects. For example, if two corresponding products in the image pair are recognized as having the same Universal Product Code (UPC), then it is likely the corresponding products are the same. In some embodiments, the image matching module 205 uses known locations on objects in an image as feature points to match to the same known locations on corresponding objects in an adjacent image. In some embodiments, the image matching module 205 uses the mapping of object feature points in the pair of adjacent images to determine a relationship between the pair of adjacent images, to align the pair of adjacent images and to identify a position of each individual image with respect to a stitched panoramic image representation. The alignment of images is based on the same objects being recognized in the pair of adjacent images.

In one embodiment, the image matching module 205 receives the images in sequential order and thus an image can match the image taken before and after it. In other embodiments, the images are tagged with an order the images were taken. For example, if the images are commonly captured by the client device 115 in a serpentine path (down, right, up, right, down, right, etc.) there is a pattern to how the image matching module 205 performs feature matching. An image should overlap with the previous image, the image previous to that will be diagonal and not have much overlap and the image previous to that will overlap for odd numbered images (assuming numbering of images in the sequence starts at 0, and initial motion is up or down). Thus for image i, the image matching module 205 searches for matching points with image i-1 and if image i is odd numbered, the image matching module 205 searches for matching points with image i-3. In some embodiments, the image matching module 205 searches for matching points within the overlap region (for e.g., 50% to 60% overlap) between the images. For example, the image matching module 205 performs image matching on objects present in the overlap region and excludes other objects from image matching in the remaining 40% to 50% region that is not overlapping.

Figure 3:
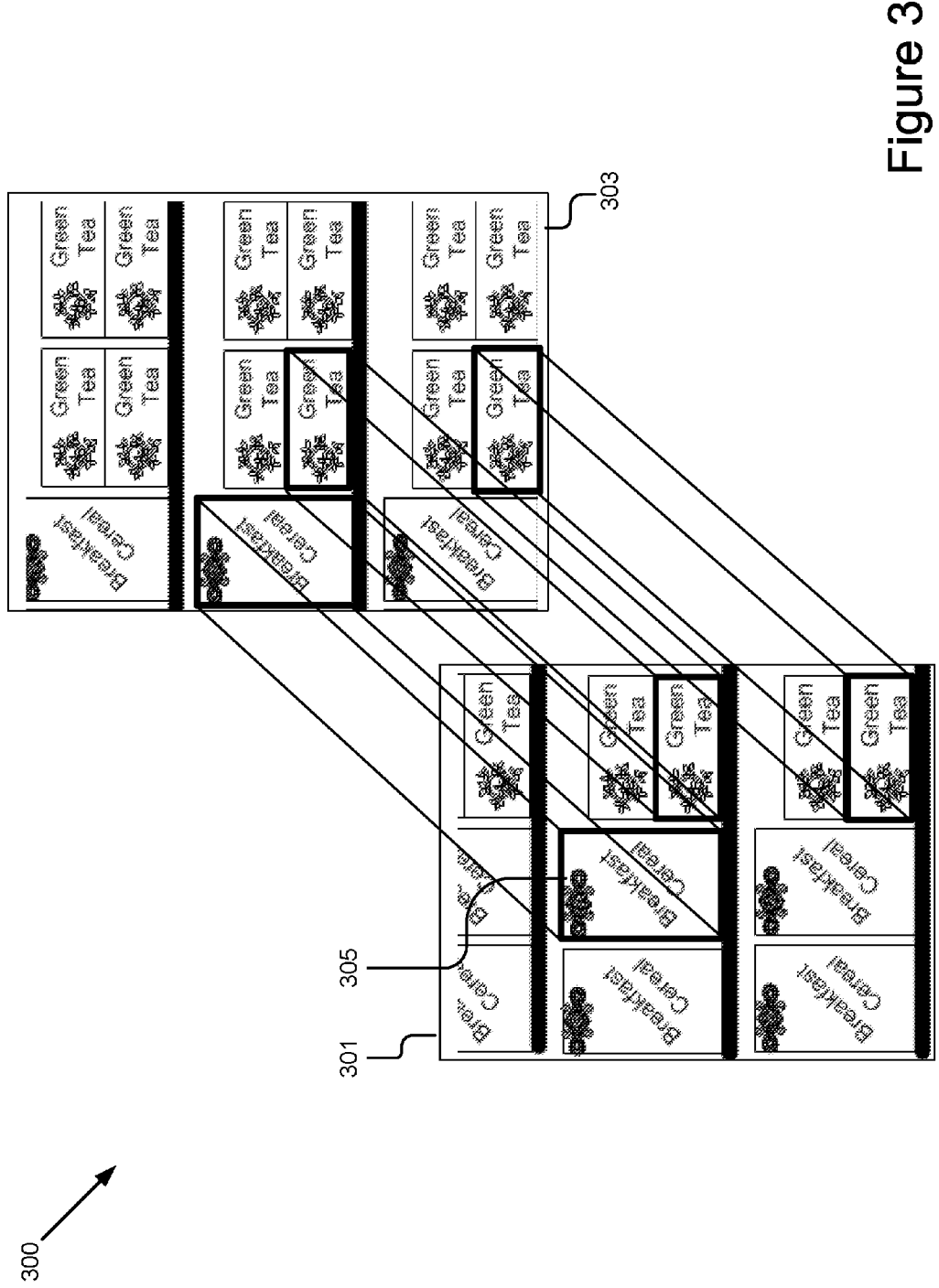
FIG. 3 is a graphical representation of one embodiment of a process for matching a pair of adjacent images of a portion of a shelving unit.

As shown in the example of FIG. 3, the graphical representation 300 illustrates one embodiment of a process for matching a pair of adjacent images of a portion of a shelving unit. In FIG. 3, the graphical representation 300 includes a first image 301 and a second image 303 of a shelving unit in a retail store. The shelving unit is stocked with consumer packaged products. The first image 301 and the second image 303 may partially overlap with each other. In some embodiments, the image matching module 205 identifies products corresponding to the same product identifier in the first image 301 and the second image 303. In some embodiments, the image matching module 205 determines feature correspondence between the first image and the second image for one or more recognized products. For example, the image matching module 205 matches the feature points at the four corners of the recognized breakfast cereal product 305 between the first image 301 and the second image 303 and determines a set of four corresponding features.

In some embodiments, the image matching module 205 performs object based image matching by determining a homography between the pairs of adjacent images. In some embodiments, the image matching module 205 creates a homography for each corresponding object recognized in the pair of adjacent images using the direct linear transformation (DLT) method. A homography may be based on four corresponding feature points associated with a recognized object in the pair of adjacent images and the homography can be referred to as a perspective transformation. The image matching module 205 identifies a polygon ROI bordering the recognized object. The image matching module 205 identifies one or more feature points at the corners of the polygon of the recognized object. For example, if a recognized product is box-like with UPC "00003777277," the image matching module 205 identifies four feature keypoints at the four corners and assigns feature descriptors as "00003777277_0," "00003777277_1," "00003777277_2," and "00003777277_3." If the same product is recognized in the adjacent image, the image matching module 205 assigns equivalent descriptors to the corner feature keypoints with a zero distance.

Given four corresponding points from the pair of adjacent images A and B: $(x_1, y_1)$, $(x_2, y_2)$, $(x_3, y_3)$, $(x_4, y_4)$, a homography represented by $H_{AB}$ can be formally stated as:

$$H_{AB} = \begin{pmatrix} h_{1,1} & h_{1,2} & h_{1,3} \\ h_{2,1} & h_{2,2} & h_{2,3} \\ h_{3,1} & h_{3,2} & 1 \end{pmatrix}$$

The homography $H_{AB}$ is a full perspective transformation that operates on points with homogeneous coordinates (x, y, 1). If the homography $H_{AB}$ is good, the homography $H_{AB}$ can be defined as a mapping of the coordinates from image A to image B and the mapping can be formally stated as:

$$(x_B, y_B, c) = H_{AB}(x_A, y_A, 1)$$

As an example, if there was only one recognized object in image A and image B, the homography $H_{AB}$ may be used as the mapping between image A and image B. The homography $H_{AB}$ may then map all the feature points in image A and image B. In practice, there can be multiple recognized objects and the image matching module 205 creates the corresponding homographies for each of the recognized objects. There can be errors in the recognized object where an object in image A may match several objects in image B. In some embodiments, the image matching module 205 determines the best match among the plurality of object matches. The best match has a maximum number of inliers (geometrically consistent matches).

In some embodiments, the image matching module 205 determines whether a homography determined for a recognized object in the pair of adjacent images is good or bad. For example, if one of the four corresponding feature points of the recognized object from one image is mismatched with feature points of a different recognized object in the other image of the pair, the homography based on those four corresponding feature points might be bad. In some embodiments, the image matching module 205 uses the homography to perform a mapping of other feature points in the pair of adjacent images. The image matching module 205 determines whether the homography is good or bad by analyzing results of the mapping. In some embodiments, the image matching module 205 determines whether a result of the mapping is outside of a range of what may be expected from the restrictions associated with the image capture pattern of the client device 115. The homography has scale, translation, rotation and skew as its discrete components. In some embodiments, the image matching module 205 checks, for example, whether image scale varies by a factor of two or more, whether rotation varies on the order of 45 degrees or more, whether the skew varies on the order of 10 percent or more, etc. between the pair of adjacent images. In some embodiments, the image matching module 205 rejects the homography if the result of the mapping is outside of the range and eliminates the feature points associated with that rejected homography. In some embodiments, the image matching module 205 identifies another set of corresponding feature points in the pair of adjacent images to determine a new homography. In some embodiments, the image matching module 205 adds the homographies for the pair of adjacent images that were determined to be good to a list of homographies.

In some embodiments, the image matching module 205 clusters the homographies included in the list such that the homographies may be included in a same cluster if it is determined that the reprojection of feature points is less than half an object size. For example, the image matching module 205 identifies a first homography associated with a first recognized object in the pair of adjacent images from the list of homographies. The image matching module 205 uses the first homography on four corresponding feature points of a second recognized object to determine a mapping from one image to the other image in the pair of adjacent images. The image matching module 205 compares whether this mapping from one image to the other is within half an object size of the actual mapping of the second recognized object (mapped using a second homography determined for the second recognized object). The image matching module 205 clusters the first homography and the second homography in a same cluster based on the determination that the mapping comparison is within half an object size. The image matching module 205 repeats the same steps for other combinations of homographies included in the list to perform the clustering of homographies.

In some embodiments, the image matching module 205 determines a best cluster (or N best clusters). In some embodiments, the image matching module 205 identifies the cluster with a highest number of homographies as the best cluster. In some embodiments, the image matching module 205 refines the homography for the best cluster using random sample consensus (RANSAC). RANSAC uses a minimal set of randomly sampled correspondences to select inliers. For example, the image matching module 205 identifies the object pairs for the number of homographies in the best cluster and identifies four features for each object pair in the best cluster. For example, if there are 10 objects in the best cluster, the image matching module 205 identifies 40 feature points (four feature points per object). The image matching module 205 performs feature matching on the 40 features points using RANSAC, rejects outliers and identifies a number of consistent matches (inliers) to refine the homography for the best cluster. In some embodiments, the image matching module 205 identifies the pair of adjacent images as overlapping with each other when the number of consistent matches compared to the total number of matches satisfies a threshold. In some embodiments, the image matching module 205 aligns the pair of adjacent images for panoramic stitching based on the number of consistent matches. In some embodiments, the image matching module 205 repeats the process of finding the best match between each pair of adjacent images in the sequence of images.

In some embodiments, the image matching module 205 may fail to determine a homography from objects in the pair of adjacent images when there are no recognized objects. The image matching module 205 reverts to feature point matching to determine a homography in the pair of adjacent images in the event that the object matching fails. In some embodiments, the image matching module 205 uses object matching in combination with feature point matching and gives more weight to object based image matching relative to the feature point matching. If not weighted appropriately, the feature point matches may dominate because there are a large number of feature points relative to the number of objects. In one embodiment, the weighted number of inliers is the sum of 1.0 for each inlier point from object matching and $\alpha N_o/N_f$ for each point from feature matching where $N_o$ is the number of all points for object based matching, $N_f$ is the number of all points from feature based matching, and $\alpha$ is a constant $<=1.0$ such as 1.0 or 0.5. The value of $\alpha N_o/N_f$ is typically less than 1.0.

In some embodiments, the image matching module 205 sends the data including homographies of the each pair of adjacent images to the bundle adjustment module 207. In other embodiments, the image matching module 205 stores the data including homographies of the each pair of adjacent images in the data storage 243.

The bundle adjustment module 207 may include software and/or logic to provide the functionality for determining a relationship between all images (and in some embodiments all objects) in the images of the scene. In some embodiments, this relationship is determined by estimating camera parameters for pairs of connected images across all images. For example, the bundle adjustment module 207 computes the reprojection error for a plurality of matching feature points in each pair of connected images. Each feature is projected into all the images in which it matches, and the sum of squared image distances is minimized with respect to the camera parameters. The bundle adjustment module 207 performs bundle adjustment for image alignment because the concatenation of pairwise homographies could cause errors to accumulate.

In some embodiments, the bundle adjustment module 207 identifies a group of connected sets of matching images and estimates initial camera position for each image. For example, given four matching points, it is possible to warp one image to match the other with a homography, provided that the camera location is the same or the images are planar. In the retail scenario described above, the camera is moved to various locations for capture so the camera location is not the same. However, the shelving units are almost planar and for objects in the same plane captured from multiple camera positions, a single camera position can be estimated.

In some embodiments, the bundle adjustment module 207 uses the homographies between connected images to estimate the camera parameters, such as a distance of the camera to the scene and relative orientation. In some embodiments, the bundle adjustment module 207 determines a cost for adjusting or estimating camera parameters. The cost penalizes camera positions that deviate too far from the pattern of image capture, which in some embodiments is a grid like capture position. For example, the grid like capture position can be associated with a serpentine pattern of image capture. The bundle adjustment module 207 determines a camera position for each pair of matching images from the homographies between each pair of matching images using the cost associated with the camera positions deviating from the grid. The bundle adjustment module 207 determines new homographies between each pair of matching images based on the determined camera positions and the feature point matches. This process repeats until a final camera position is determined (e.g., the camera position converges or the change in the camera position meets a threshold). In embodiments where the image matching module 205 performs object based image matching, the features used by bundle adjustment module 207 include object features. Using object features allows the relationship between images to minimize errors for object locations, ignoring image regions that do not correspond to objects.

In some embodiments, the bundle adjustment module 207 adds feature matches to a fake image that represents the full size of the stitched image and represents the pattern of image capture. For example, the bundle adjustment module 207 receives a planogram and creates the fake image by matching recognized objects to the planogram using object image matching. In other embodiments without a planogram, the fake image is created using expected object positions. The fake image is used for the joint positioning of all the images. In some embodiments, the bundle adjustment module 207 determines camera position between each pair of matching images from the homographies between each pair of matching images. The bundle adjustment module 207 determines homographies between each pair of matching images based on the determined camera positions and original feature point matches along with the features matches corresponding to the grid. The additional feature matches penalize the transformation if the determined camera positions moved the images too far from the grid.

In some embodiments, the bundle adjustment module 207 uses the initial estimates for the camera parameters if the bundle adjustment for the pairs of connected images across all images fails to converge. In some embodiments, the bundle adjustment module 207 sends data including the camera parameter estimations to the image seaming module 209. In other embodiments, the bundle adjustment module 207 stores the data including the camera parameter estimations in the data storage 243. The relationship between all images and objects in the images described by the stored camera parameter estimations may be used for various purposes such as determining a realogram, comparing a planogram and realogram, computing metrics (KPI) such as share-of-shelf, etc.

The image seaming module 209 may include software and/or logic to provide the functionality for determining a seam path between pairs of adjacent images that consistently match with each other. In some embodiments, the image seaming module 209 receives pairs of adjacent images that consistently match with each other from the image matching module 205 and/or the bundle adjustment module 207. The image seaming module 209 identifies the position of each adjacent image within a stitched representation and determines which portion of each one of the pair of adjacent images may represent each pixel of the panoramic stitched image based on the seam path. In some embodiments, the image seaming module 209 determines a seam path between a pair of adjacent images based on a graph cut algorithm. The seam path identifies a boundary of each image in the panoramic stitched image.

In some embodiments, the image seaming module 209 identifies an overlap region between the pairs of adjacent images. For example, the overlapping region includes content that could be contributed by two or more adjacent images that consistently match with each other. In some embodiments, the image seaming module 209 identifies pixel locations for each of the pair of adjacent images. For example, the image seaming module 209 identifies pixel locations for the pair of adjacent images that are within the overlap region. In some embodiments, the image seaming module 209 assigns a cost between each pair of adjacent pixel locations in the pair of adjacent images that are within the overlap region. This cost dictates a penalty associated with placing a seam for switching from one image to another image between the adjacent pixel locations. For example, the adjacent pixel locations for a single pixel location can include pixel locations on the left, right, above and below.

In some embodiments, the image seaming module 209 identifies a color value at a pixel location in the pair of adjacent images. In some embodiments, the image seaming module 209 determines a cost based on color similarity between pairs of adjacent pixel locations. For example, let s and t be two adjacent pixel locations in the overlap region between image A and image B, then the cost function M based on color similarity between the two adjacent pixel locations can be formally stated as:

$$M(s,t,A,B)=\|A(s)-B(s)\|+\|A(t)-B(t)\|;$$

where A(s) is the color value of a pixel in image A at pixel location s, B(s) is the color value of a pixel in image B at pixel location s, A(t) is the color value of a pixel in image A at pixel location t, and B(t) is the color value of a pixel in image B at pixel location t. The cost may be low between a pair of adjacent pixels if pixels from both image A and image B are similar on both sides of the pair of adjacent pixels.

In some embodiments, the image seaming module 209 determines a cost between pairs of adjacent pixel locations based on an object indicator of whether or not an object is present at a pixel location. For example, in case of retail images, it is beneficial if the seam path is placed to go between products and not through products. The cost function based on object indicator dictates a cost of placing a seam path on whether or not a product is at a pixel location. Let s and t be two adjacent pixel locations in the overlap region between image A and image B, then the cost function M based on object indictor between two adjacent pixel locations can be formally stated as:

$$M(s,t,A,B)=A_p(s)+B_p(s)+A_p(t)+B_p(t);$$

where $A_p(t)=1$ for an object being present image b at pixel location t, and zero otherwise.

In some embodiments, the image seaming module 209 increases the cost at the center of the object more than at the edge of the object. For example, if the packaged products are placed very close in the image, the seam path can be placed between the packaged products because of the increased cost. In some embodiments, the image seaming module 209 determines a cost by combining the cost based on the color similarity and the cost based on the object indicator indicating whether or not an object is present at a pixel location. In some embodiments, the image seaming module 209 adjusts the relative weight of costs associated with color similarity and object indicator. For example, Let s and t be two adjacent pixel locations in the overlap region between image A and image B, then the weighted sum of the cost between two adjacent pixel locations can be formally stated as:

$$M(s,t,A,B)=\|A(s)-B(s)\|+\|A(t)-B(t)\|+w*(A_p(s)+B_p(s)+A_p(t)+B_p(t));$$

where w adjust the relative weight of color similarity and object presence. In an example, the relative weight w is 255.

In some embodiments, the image seaming module 209 modifies the pairs of adjacent images to penalize a placement of the seam path through the products. In some embodiments, the image seaming module 209 identifies one or more objects within the overlap region between pairs of adjacent images. The image seaming module 209 selects a distinct color value for each adjacent image (for example, a first color for first image 401 and a second color for second image 403 where the first color and second color are different). The image seaming module 209 modifies color values for a set of pixel locations forming a boundary around the one or more objects in the image to the distinct color value. For example, the cost function based on color similarity between the two adjacent pixel locations within the overlap region can increase and the seam path may get placed between the packaged products because of the increased cost.

In some embodiments, the image seaming module 209 determines a seam path running between a plurality of pairs of adjacent pixel locations in the overlap region between the pairs of adjacent images. The seam can be either vertical or horizontal for each pair of adjacent pixel locations. In some embodiments, the image seaming module 209 identifies a seam path such that a total cost of the seam path is low. The image seaming module 209 evaluates the cost between a pair of adjacent pixels to determine whether the seam path should run between the pair of adjacent pixels. The low cost seam path computation can be formulated as a graph cut problem, for example, a max-flow min-cut problem. The image seaming module 209 uses algorithms to solve the max-flow min-cut problem. For example, the algorithms may include Ford-Fulkerson algorithm, Edmonds-Karp algorithm, etc. In some embodiments, the image seaming module 209 determines a portion of pixels from each image of the pair of adjacent images to represent in a stitched panoramic image based on the determined seam.

Figure 4:
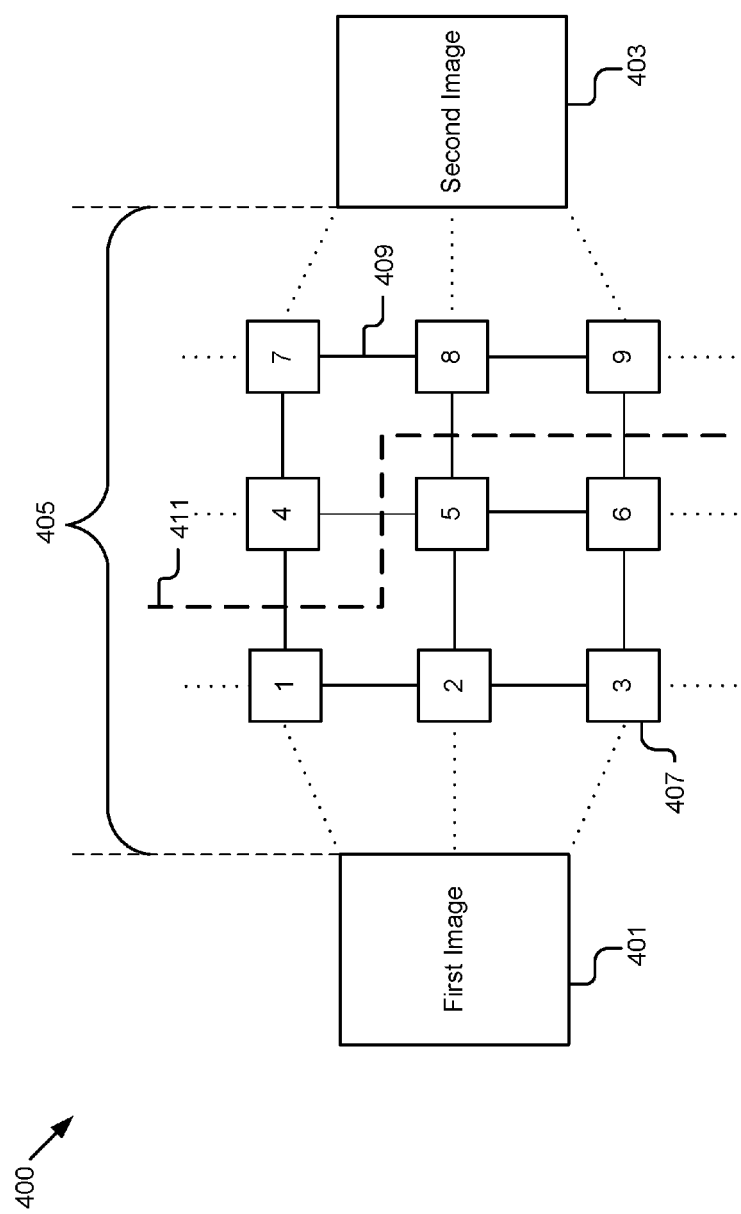
FIG. 4 is a graphical representation of one embodiment of image seaming process for determining a seam between a pair of adjacent images.

As shown in the example of FIG. 4, the graphical representation 400 illustrates one embodiment of an image seaming process for determining a seam between a pair of adjacent images. In FIG. 4, the graphical representation 400 includes a pair of adjacent images, a first image 401 and a second image 403 with an overlap region 405 between the first image 401 and the second image 403. The overlap region 405 is represented as an example graph with a node 407 per pixel. The lines 409 connecting a pair of adjacent pixels (representing edges in the graph) can be associated with a cost. In some embodiments, the image seaming module 209 determines a seam 411 in the overlap region 405 by solving a graph cut problem. The image seaming module 209 determines a low cost path for the seam 411 through the graph that separates the first image 401 and the second image 403 in the overlap region 405. As a result of the seam 411, in some embodiments, the image seaming module 209 determines the pixels numbered 1, 2, 3, 5 and 6 from the first image 401 as the pixels to be used for generating a panoramic stitched image. Similarly, the image seaming module 209 determines the pixels numbered 4, 7, 8 and 9 from the second image 403 as the pixels to be used for generating a panoramic stitched image.

In some embodiments, the image seaming module 209 combines the seams of all the pairs of adjacent images in the texture of the panoramic stitched image. The image seaming module 209 accounts for the old seams that are already placed in the panoramic stitched image for a previous pair of adjacent images. For example, the image seaming module 209 places a seam between the first two pairs of adjacent images and this seam is considered an old seam. The image seaming module 209 receives an adjacent image that consistently matches with the previous pair of adjacent images. The image seaming module 209 incorporates the old seam costs into a new graph cut problem for finding a seam path between the pairs of pixel locations in the overlap region between the new matching adjacent image and the previous pair of adjacent images. In some embodiments, the image seaming module 209 sends data including instructions to the user interface module 211 to generate and display the panoramic stitched image on the user interface of the client device 115.

Figure 5:
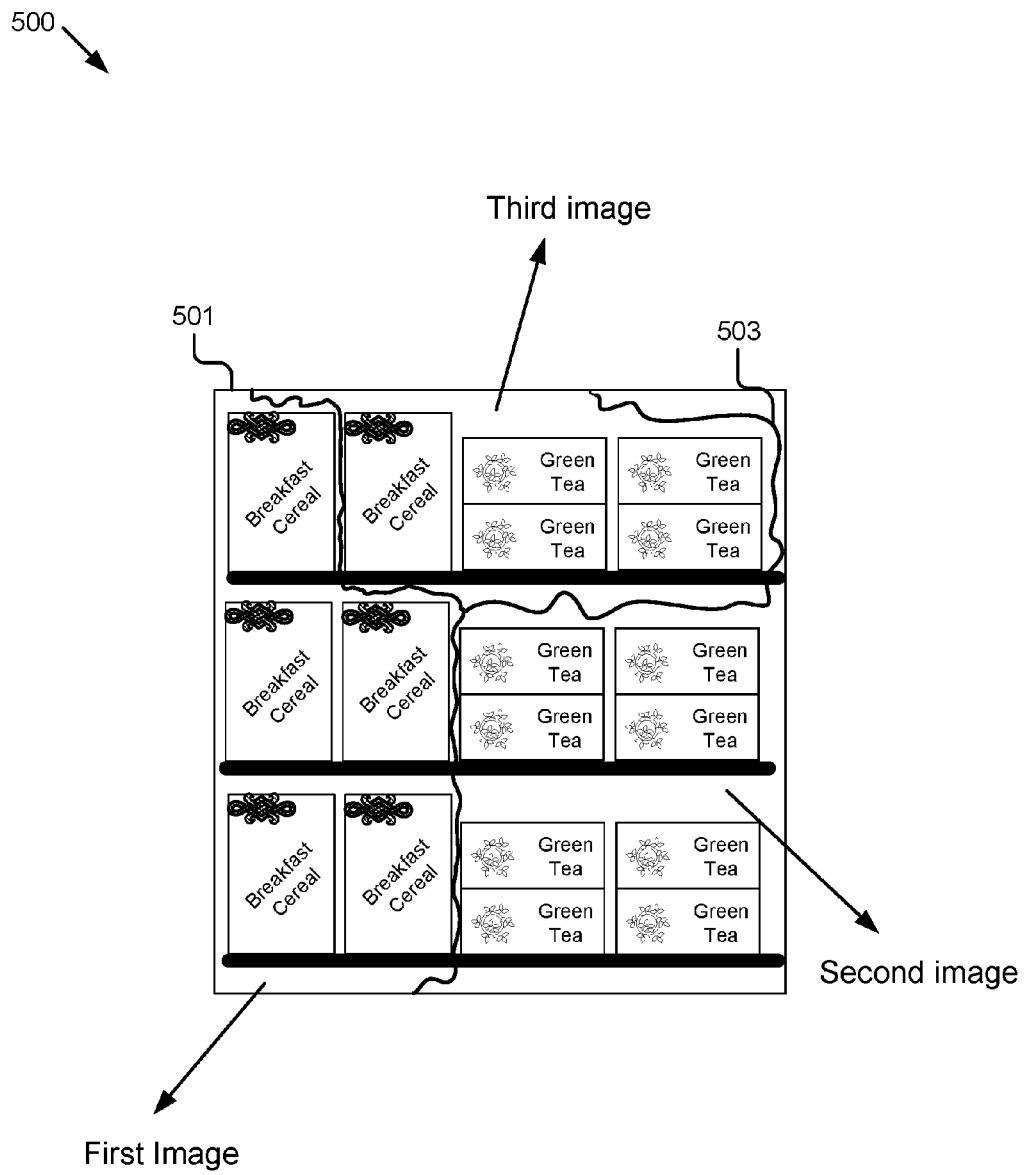
FIG. 5 is a graphical representation of one embodiment of image seaming performed on adjacent images of a portion of a shelving unit.

As shown in the example of FIG. 5, the graphical representation 500 illustrates one embodiment of image seaming performed on adjacent images of a portion of a shelving unit. In FIG. 5, the graphical representation 500 includes three adjacent images being seamed together to represent a panoramic stitched image 501. In some embodiments, the image seaming module 209 determines the seam 503 based on the product locations. In some embodiments, the image seaming module 209 determines a seam 503 that can be a combination of a first seam determined for the adjacent first and the second image, a second seam determined for the adjacent first and the third image and a third seam determined for the adjacent second and the third image. In the graphical representation 500, the seam 503 is shown to run between the products based on the image seaming module 209 determining that the path of the seam 503 between the product locations to be low cost.

Returning to FIG. 2, the user interface module 211 may include software and/or logic for providing user interfaces to a user. In some embodiments, the user interface module 211 receives instructions from the image processing module 203 to generate a graphical user interface on the display of the client device 115 on how to move the client device 115 in capturing images. In some embodiments, the user interface module 211 receives instructions from the image seaming module 209 to generate a graphical user interface that displays the panoramic stitched image. In other embodiments, the user interface module 211 sends graphical user interface data to an application (e.g., a browser) in the client device 115 via the communication unit 241 causing the application to display the data as a graphical user interface.

Figure 6:
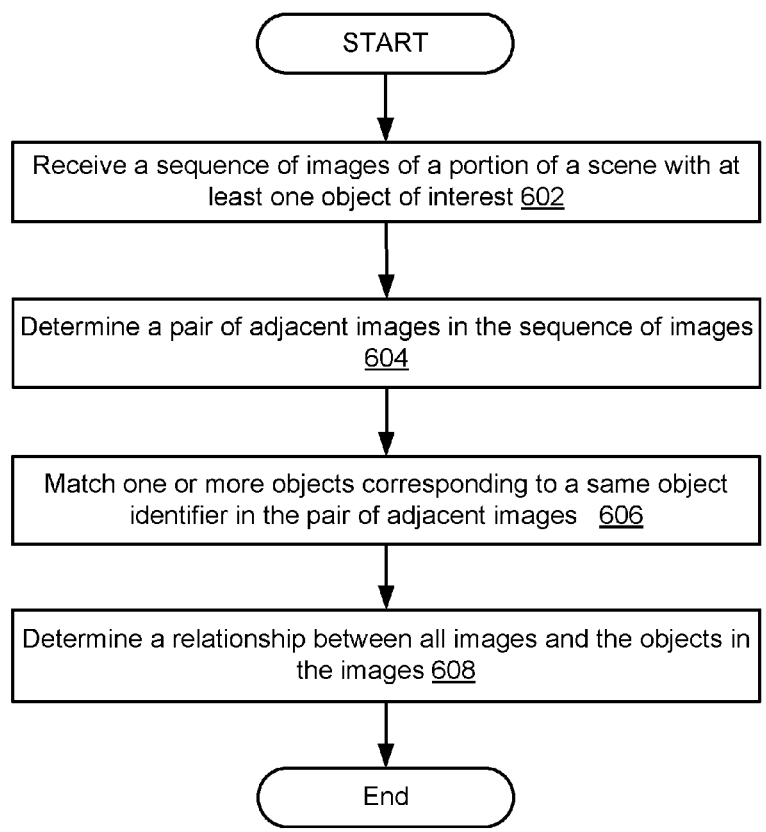
FIG. 6 is a flow diagram illustrating one embodiment of a method for determining a relationship between a pair of adjacent images.

FIG. 6 is a flow diagram illustrating one embodiment of a method 600 for determining a relationship between a pair of adjacent images. At 602, the image processing module 203 receives a sequence of images of a scene. At 604, the image matching module 205 determines a pair of adjacent images in the sequence of images. At 606, the image matching module 205 matches one or more objects corresponding to a same object identifier in the pair of adjacent images. At 608, bundle adjustment module 207 determines a relationship between all images and the objects in the images. For some applications, this relationship is used to create a realogram, to determine metrics (e.g., KPIs) such as share of shelf, to compare the realogram with the planogram, etc. In other applications, this relationship is used by image seaming module 209 to create a stitched panoramic image.

Figure 7:
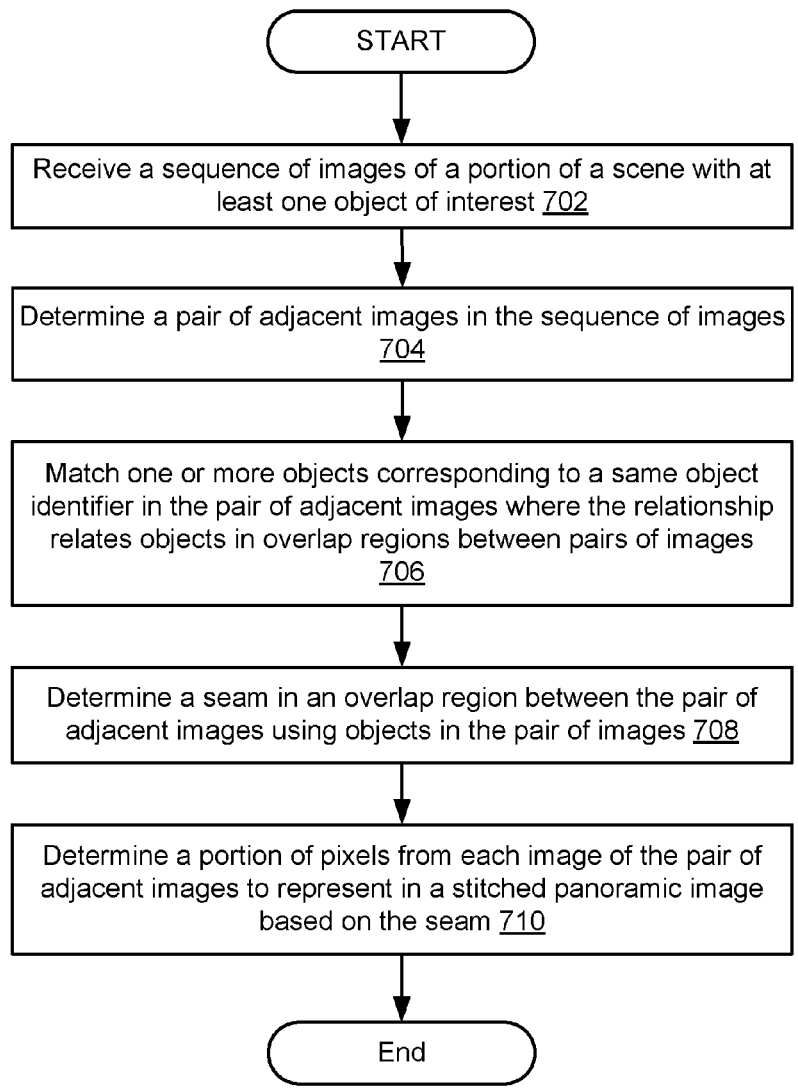
FIG. 7 is a flow diagram illustrating one embodiment of a method for determining a seam between a pair of adjacent images.

FIG. 7 is a flow diagram illustrating one embodiment of a method 700 for determining a seam between a pair of adjacent images. At 702, the image processing module 203 receives a sequence of images of a scene. At 704, the image matching module 205 determines a pair of adjacent images in the sequence of images. At 706, the image matching module 205 matches one or more objects corresponding to a same object identifier in the pair of adjacent images, where the relationship relates object in overlap regions between pairs of images (e.g., using homographies as described herein). At 708, the image seaming module 209 determines a seam in an overlap region between the pair of adjacent images using objects in the pair of images. At 710, the image seaming module 209 determines a portion of pixels from each image of the pair of adjacent images to represent in a stitched panoramic image based on the seam.

Figure 8:
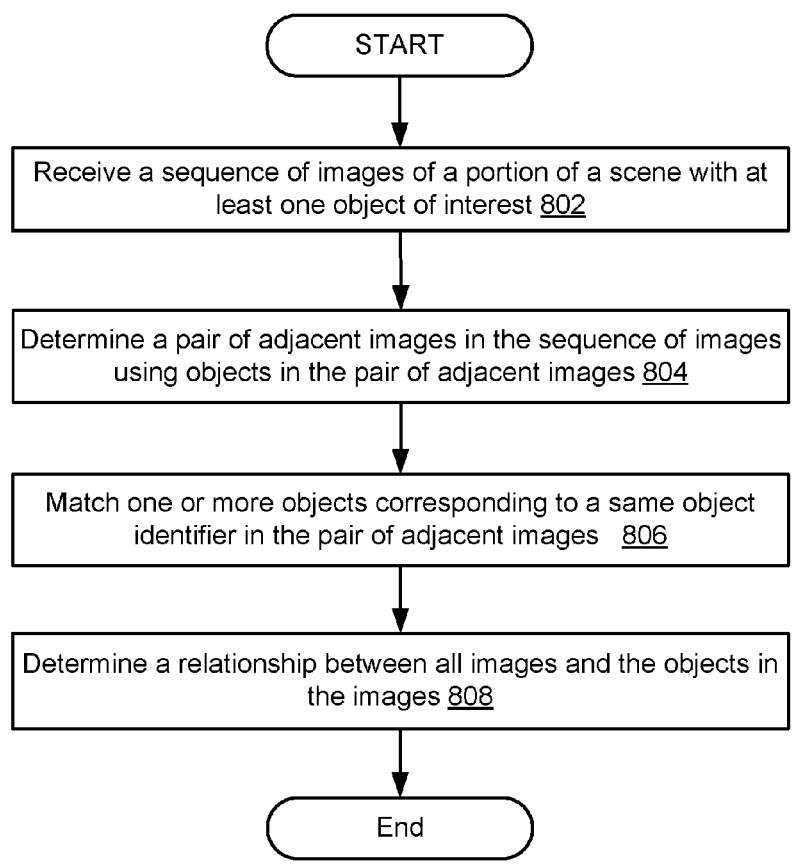
FIG. 8 is a flow diagram illustrating one embodiment of a method for determining a relationship between a pair of adjacent images using objects in the pair of adjacent images.

FIG. 8 is a flow diagram illustrating one embodiment of a method 800 for determining a relationship between a pair of adjacent images using objects in the pair of adjacent images. At 802, the image processing module 203 receives a sequence of images of a scene. At 804, the image matching module 205 determines a pair of adjacent images in the sequence of images using objects in the pair of adjacent images (e.g., using homographies as described herein). At 806, the image matching module 205 matches one or more objects corresponding to a same object identifier in the pair of adjacent images. At 808, bundle adjustment module 207 determines a relationship between all images and the objects in the images.

Figure 9:
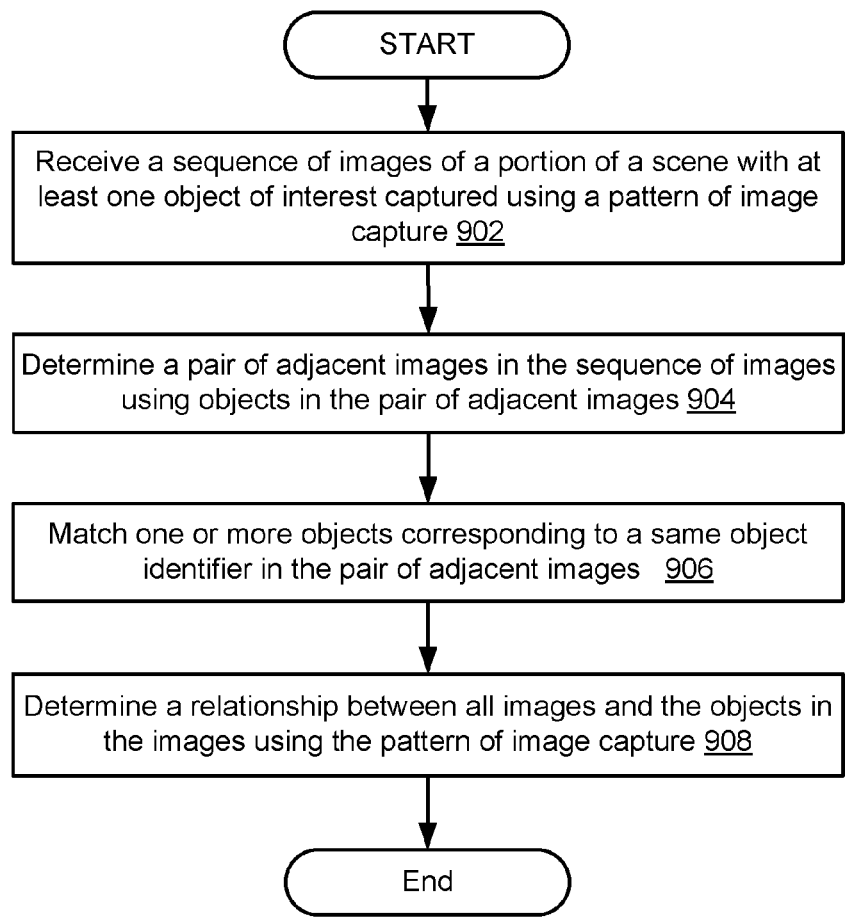
FIG. 9 is a flow diagram illustrating one embodiment of a method for determining a relationship between a pair of adjacent images using a pattern of image capture.

FIG. 9 is a flow diagram illustrating one embodiment of a method 900 for determining a relationship between a pair of adjacent images using objects in the pair of adjacent images. At 902, the image processing module 203 receives a sequence of images of a scene with at least one object of interest captured using a pattern of image capture. At 904, the image matching module 205 determines a pair of adjacent images in the sequence of images using objects in the pair of adjacent images. At 906, the image matching module 205 matches one or more objects corresponding to a same object identifier in the pair of adjacent images. At 908, bundle adjustment module 207 determines a relationship between all images and the objects in the images using the pattern of image capture.

Figure 10A:
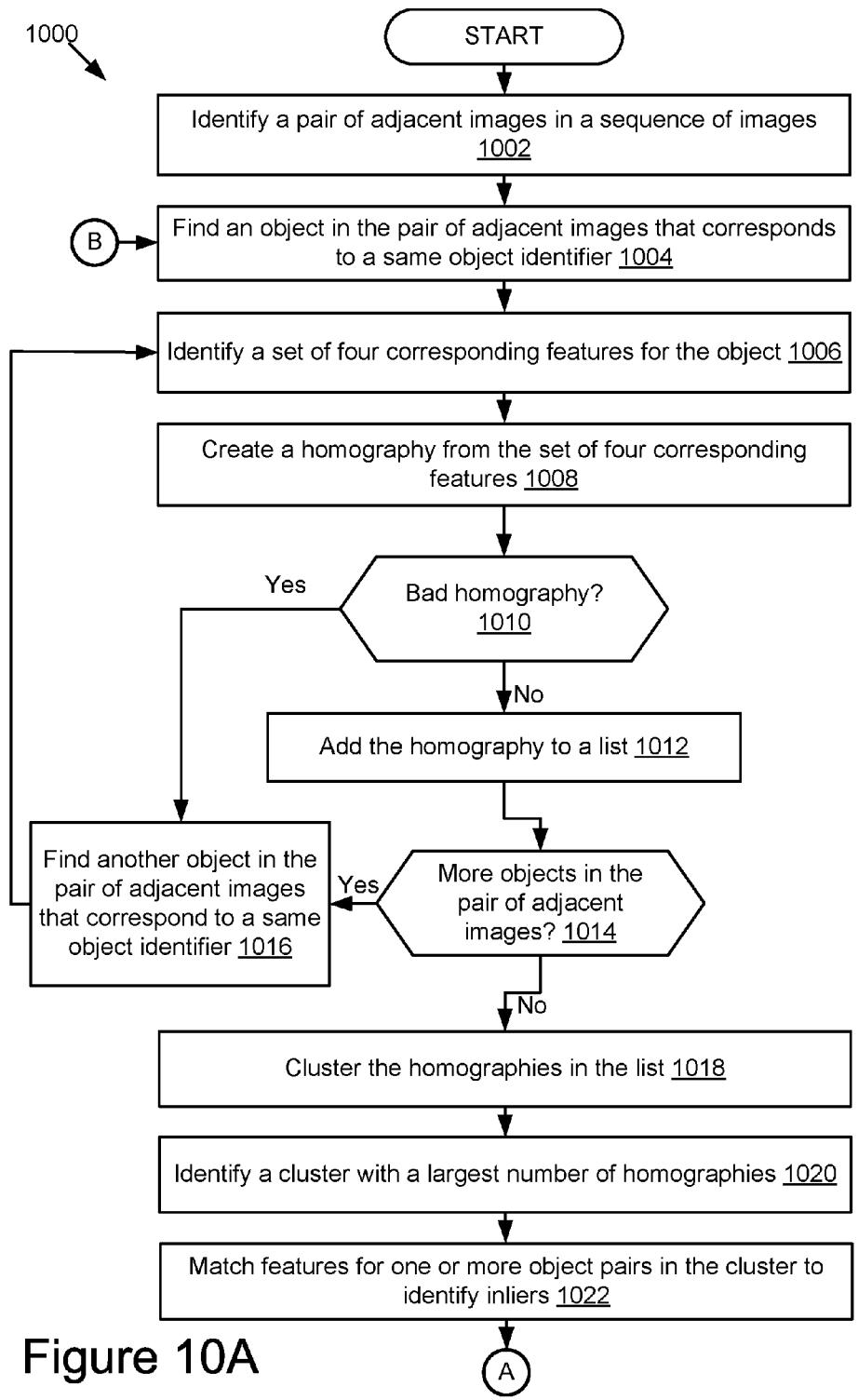
FIGS. 10A-10B are flow diagrams illustrating one embodiment of a method for performing object matching between multiple pairs of adjacent images.
Figure 10B:
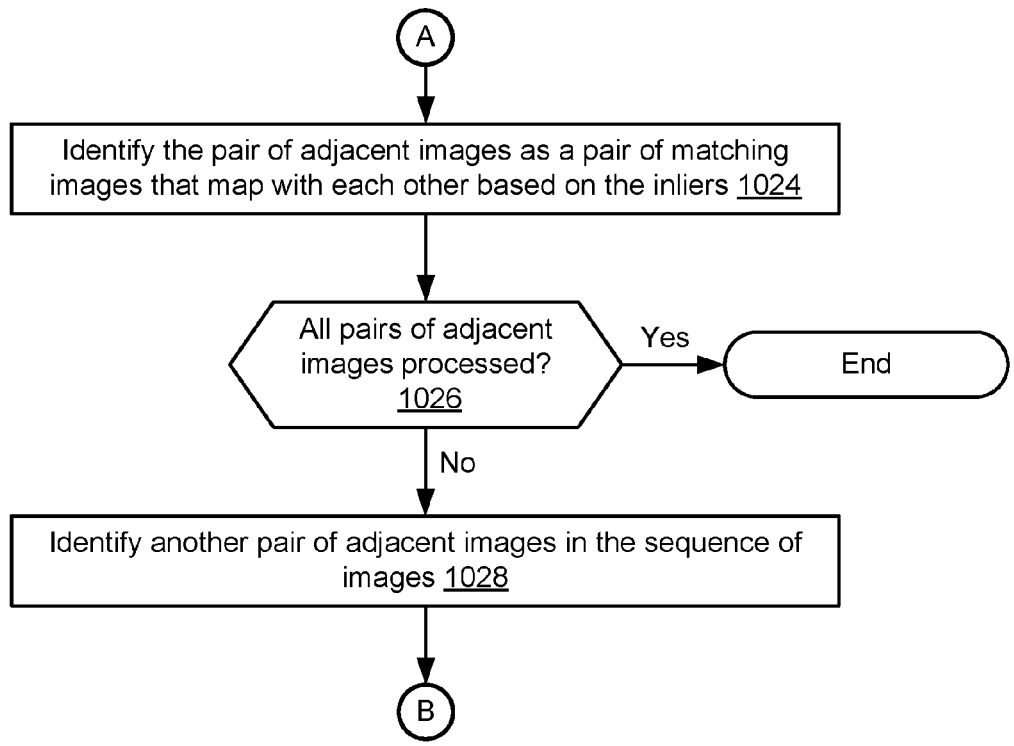

FIGS. 10A-10B are flow diagrams illustrating one embodiment of a method 1000 for performing object matching between multiple pairs of adjacent images. At 1002, the image matching module 205 identifies a pair of adjacent images in a sequence of images. At 1004, the image matching module 205 finds an object in the pair of adjacent images that corresponds to a same object identifier. At 1006, the image matching module 205 identifies a set of four corresponding features for the object. At 1008, the image matching module 205 creates a homography from the set of four corresponding features. At 1010, the image matching module 205 determines whether the homography is bad. If the homography is bad, at 1016, the image matching module 205 finds another object in the pair of adjacent images that correspond to a same object identifier and the method 1000 repeats the process at 1006. If the homography is good, at 1012, the image matching module 205 adds the homography to a list. At 1014, the image matching module 205 determines whether there are more objects in the pair of adjacent images. If there are more objects, at 1016, the image matching module 205 finds another object in the pair of adjacent images that correspond to a same object identifier and the method 1000 repeats the process from step 1006. If there are no more objects, at 1018, the image matching module 205 clusters homographies in the list. At 1020, the image matching module 205 identifies a cluster with a largest number of homographies. At 1022, the image matching module 205 matches features for one or more object pairs in the cluster to identify inliers. At 1024, the image matching module 205 identifies the pair of adjacent images as a pair of matching images that map with each other based on the inliers. At 1026, the image matching module 205 determines whether all the pairs of adjacent images have been processed. If there are pairs of adjacent images to be processed, at 1028, the image matching module 205 identifies another pair of adjacent images in the sequence of images and the method 1000 repeats the process at 1004. If there are no remaining pairs of adjacent images to be processed, the method 1000 ends.

Figure 11:
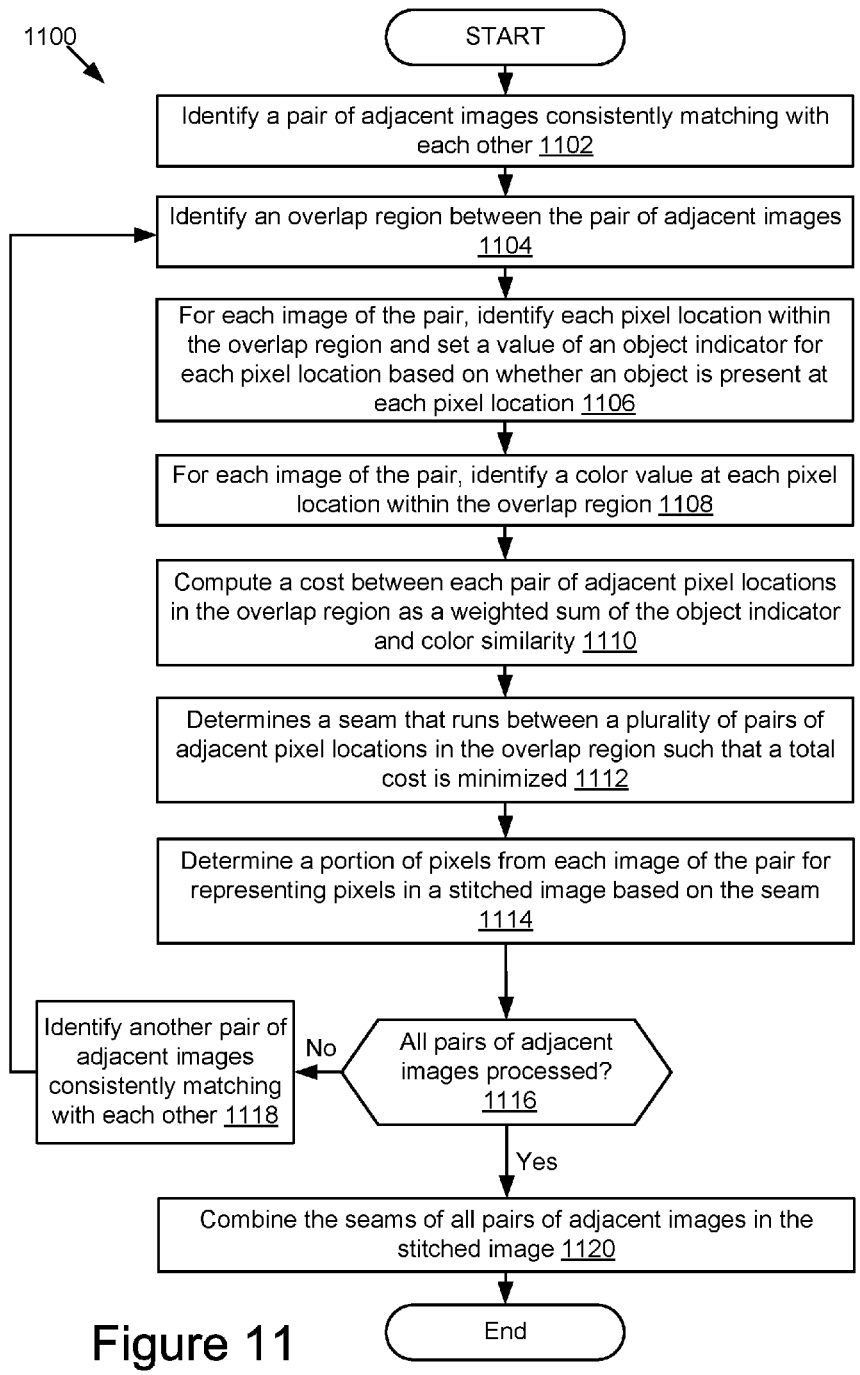
FIG. 11 is a flow diagram illustrating one embodiment of a method for determining a low cost seam between multiple pairs of adjacent images for panoramic image stitching.

FIG. 11 is a flow diagram illustrating one embodiment of a method 1100 for determining a low cost seam between multiple pairs of adjacent images for panoramic image stitching. At 1102, the image matching module 205 identifies a pair of adjacent images consistently matching with each other. At 1104, the image seaming module 209 identifies an overlap region between the pair of adjacent images. At 1106, for each image of the pair, the image seaming module 209 identifies each pixel location within the overlap region and sets a value of an object indicator for each pixel location based on whether an object is present at each pixel location. At 1108, for each image of the pair, the image seaming module 209 identifies a color value at each pixel location within the overlap region. At 1110, the image seaming module 209 computes a cost between each pair of adjacent pixel locations in the overlap region as a weighted sum of the object indicator and color similarity. At 1112, the image seaming module 209 determines a seam that runs between pairs of adjacent pixel locations in the overlap region such that a total cost is minimized. At 1114, the image seaming module 209 determines a portion of pixels from each image of the pair for representing pixels in a stitched image based on the seam. At 1116, the image seaming module 209 determines whether all the pairs of adjacent images have been processed. If there are pairs of adjacent images to be processed, at 1118, the image matching module 205 identifies another pair of adjacent images consistently matching with each other and the method 1100 repeats the process from step 1104. If there are no remaining pairs of adjacent images to be processed, at 1120, the image seaming module 209 combines the seams of all the pairs of adjacent images in the stitched image.

Figure 12:
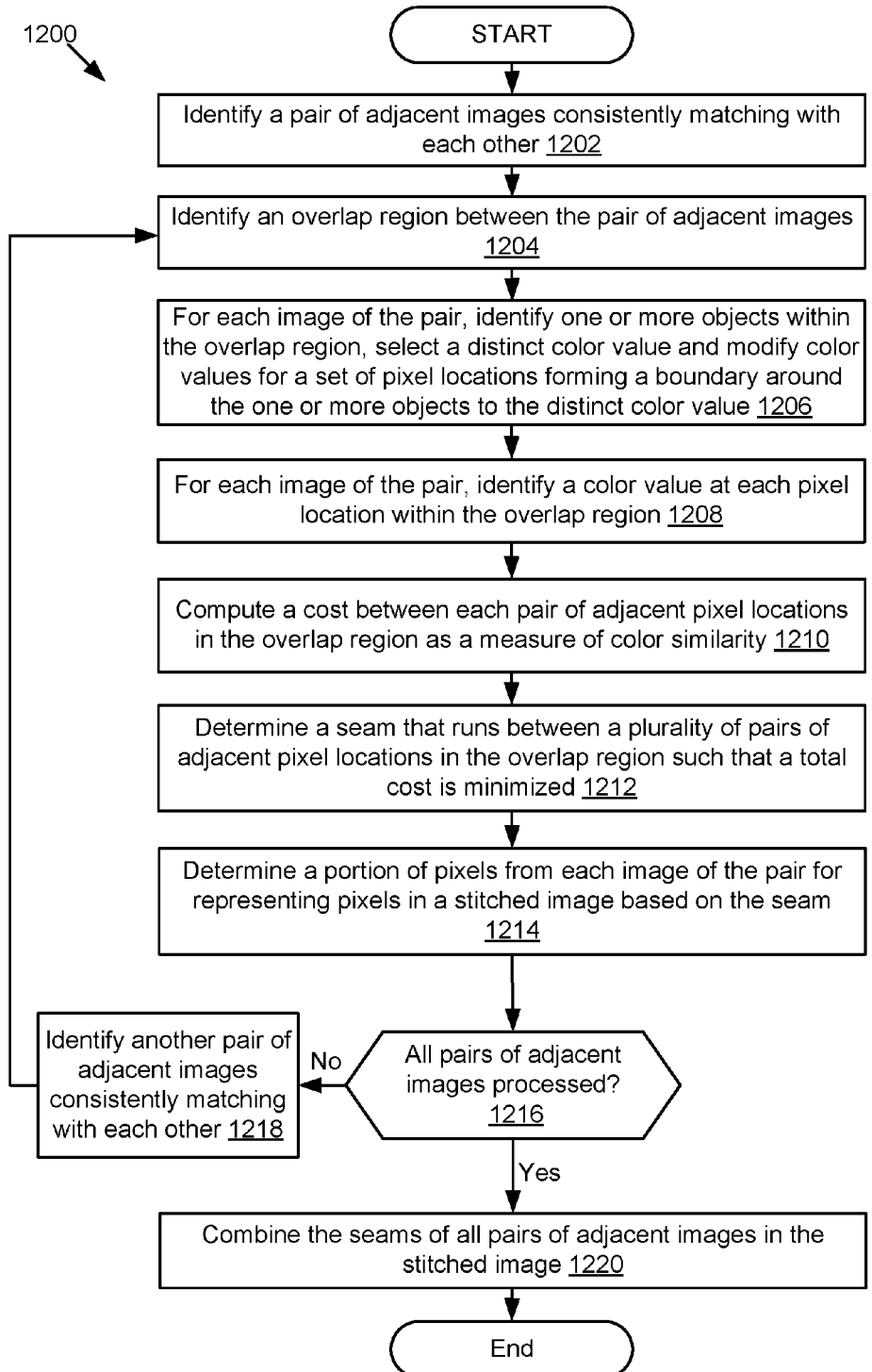
FIG. 12 is a flow diagram illustrating another embodiment of a method for determining a low cost seam between multiple pairs of adjacent images for panoramic image stitching.

FIG. 12 is a flow diagram illustrating another embodiment of a method 1200 for determining a low cost seam between multiple pairs of adjacent images for panoramic image stitching. At 1202, the image matching module 205 identifies a pair of adjacent images consistently matching with each other. At 1204, the image seaming module 209 identifies an overlap region between the pair of adjacent images. At 1206, for each image of the pair, the image seaming module 209 identifies one or more objects within the overlap region, selects a distinct color value and modifies color values for a set of pixel locations forming a boundary around the one or more objects to the distinct color value. For example, a first color is used for the boundary around objects in first image 401 and a second color is used for the boundary around objects in second image 403 where the first color and second color are different. At 1208, for each image of the pair, the image seaming module 209 identifies a color value at each pixel location within the overlap region. At 1210, the image seaming module 209 computes a cost between each pair of adjacent pixel locations in the overlap region as a measure of color similarity. At 1212, the image seaming module 209 determines a seam that runs between a plurality of pairs of adjacent pixel locations in the overlap region such that a total cost is minimized. At 1214, the image seaming module 209 determines a portion of pixels from each image of the pair for representing pixels in a stitched image based on the seam. At 1216, the image seaming module 209 determines whether all the pairs of adjacent images have been processed. If there are pairs of adjacent images to be processed, at 1218, the image matching module 205 identifies another pair of adjacent images consistently matching with each other and the method 1200 repeats the process from step 1204. If there are no remaining pairs of adjacent images to be processed, at 1220, the image seaming module 209 combines the seams of all the pairs of adjacent images in the stitched image.

A system and method for determining a seam between multiple pairs of adjacent images for panoramic image stitching has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, using one or more processors, a sequence of images of a scene;
    determining, using the one or more processors, a pair of adjacent images in the sequence of images;
    identifying, using the one or more processors, one or more objects corresponding to a same object identifier in the pair of adjacent images;
    determining, using the one or more processors, a first set of corresponding features for each identified object in the pair of adjacent images;
    determining, using the one or more processors, a homography for each identified object based on the first set of the corresponding features for each identified object;
    adding, using the one or more processors, the homography for each identified object to a list;
    clustering, using the one or more processors, homographies in the list;
    refining, using the one or more processors, homographies of a best cluster; and
    determining, using the one or more processors, a relationship between the pair of adjacent images in the sequence of images and the one or more objects in the pair of adjacent images based on the refined homographies of the best cluster.

2. The method of claim 1, wherein refining the homographies of the best cluster comprises:
    identifying a cluster with a largest number of homographies as the best cluster;
    determining a second set of corresponding features associated with homographies included in the best cluster;
    identifying inliers based on the second set of corresponding features consistently matching in the pair of adjacent images; and
    identifying the pair of adjacent images as a pair of matching images based on the inliers.

3. The method of claim 1, wherein determining the relationship between the pair of adjacent images in the sequence of images and the one or more objects in the pair of adjacent images comprises:
    determining a relationship between the one or more objects in an overlap region between the pair of adjacent images;
    determining a seam in the overlap region between the pair of adjacent images using the relationship between the one or more objects in the overlap region; and
    determining a portion of pixels from each image of the pair of adjacent images to represent in a stitched panoramic image based on the seam.

4. The method of claim 3, wherein determining the seam in the overlap region between the pair of adjacent images comprises:
    identifying the overlap region between the pair of adjacent images;
    identifying a plurality of pixel locations within the overlap region for each adjacent image of the pair;
    for each adjacent image of the pair, setting a value of an object indicator for the plurality of pixel locations based on whether an object is present at the plurality of pixel locations;
    for each adjacent image of the pair, identifying a color value at the plurality of pixel locations;
    computing a cost between each pair of adjacent pixel locations in the plurality of pixel locations within the overlap region as a weighted sum of the object indicator and color similarity; and
    determining the seam that runs between one or more pairs of adjacent pixel locations in the plurality of pixel locations within the overlap region such that a total cost is minimized.

5. The method of claim 3, wherein determining the seam in the overlap region between the pair of adjacent images comprises:
    identifying the overlap region between the pair of adjacent images;
    for each adjacent image of the pair, identifying the one or more objects within the overlap region, selecting a distinct color value, and modifying color values for a set of pixel locations forming a boundary around the one or more objects to the distinct color value;
    for each adjacent image of the pair, identifying a color value at each pixel location within the overlap region;
    computing a cost between each pair of adjacent pixel locations in the overlap region as a measure of color similarity; and
    determining the seam that runs between pairs of adjacent pixel locations in the overlap region such that a total cost is minimized.

6. The method of claim 3, comprising combining seams for all pairs of adjacent images in the stitched panoramic image.

7. The method of claim 3, wherein the seam is placed in between the one or more objects in the overlap region between the pair of adjacent images.

8. The method of claim 1, wherein determining the relationship between the pair of adjacent images in the sequence of images and the one or more objects in the pair of adjacent images includes performing bundle adjustment based on a pattern of image capture performed by a capture device.

9. The method of claim 8, wherein the pattern of image capture is based on a grid.

10. The method of claim 8, further comprising:
creating a fake image that represents the pattern of image capture; and
performing the bundle adjustment on the images using features from the sequence of images and the fake image.

11. A system comprising:
one or more processors; and
a memory, the memory storing instructions, which when executed cause the one or more processors to:
receive a sequence of images of a scene;
determine a pair of adjacent images in the sequence of images;
identify one or more objects corresponding to a same object identifier in the pair of adjacent images;
determine a first set of corresponding features for each identified object in the pair of adjacent images;
determine a homography for each identified object based on the first set of corresponding features for each identified object;
add the homography for each identified object to a list;
cluster homographies in the list;
refine homographies of a best cluster; and
determine a relationship between the pair of adjacent images in the sequence of images and the one or more objects in the pair of adjacent images based on the refined homographies of the best cluster.

12. The system of claim 11, wherein to refine the homographies of the best cluster, the instructions cause the one or more processors to:
identify a cluster with a largest number of homographies as the best cluster;
determine a second set of corresponding features associated with homographies included in the best cluster;
identify inliers based on the second set of corresponding features consistently matching in the pair of adjacent images; and
identify the pair of adjacent images as a pair of matching images based on the inliers.

13. The system of claim 11, wherein to determine the relationship between the pair of adjacent images in the sequence of images and the one or more objects in the pair of adjacent images, the instructions cause the one or more processors to:
determine a relationship between the one or more objects in an overlap region between the pair of adjacent images;
determine a seam in the overlap region between the pair of adjacent images using the relationship between the one or more objects in the overlap region; and
determine a portion of pixels from each image of the pair of adjacent images to represent in a stitched panoramic image based on the seam.

14. The system of claim 13, wherein to determine the seam in the overlap region between the pair of adjacent images, the instructions cause the one or more processors to:
identify the overlap region between the pair of adjacent images;
for each adjacent image of the pair, identify the one or more objects within the overlap region, selecting a distinct color value and modifying color values for a set of pixel locations forming a boundary around the one or more objects to the distinct color value;
for each adjacent image of the pair, identify a color value at each pixel location within the overlap region;
compute a cost between each pair of adjacent pixel locations in the overlap region as a measure of color similarity; and
determine the seam that runs between a plurality of pairs of adjacent pixel locations in the overlap region such that a total cost is minimized.

15. The system of claim 13, wherein to determine the seam in the overlap region between the pair of adjacent images, the instructions cause the one or more processors to:
identify the overlap region between the pair of adjacent images;
identify a plurality of pixel locations within the overlap region for each adjacent image of the pair;
for each adjacent image of the pair, set a value of an object indicator for the plurality of pixel locations based on whether an object is present at the plurality of pixel locations;
for each adjacent image of the pair, identify a color value at the plurality of pixel locations;
compute a cost between each pair of adjacent pixel locations in the plurality of pixel locations within the overlap region as a weighted sum of the object indicator and color similarity; and
determine the seam that runs between one or more pairs of adjacent pixel locations in the plurality of pixel locations within the overlap region such that a total cost is minimized.

16. A computer program product comprising a non-transitory computer readable medium storing a computer readable program, wherein the computer readable program when executed on a computer causes the computer to:
receive a sequence of images of a scene;
determine a pair of adjacent images in the sequence of images;
identify one or more objects corresponding to a same object identifier in the pair of adjacent images;
determine a first set of corresponding features for each identified object in the pair of adjacent images;
determine a homography for each identified object based on the first set of corresponding features for each identified object;
add the homography for each identified object to a list;
cluster homographies in the list;
refine homographies of a best cluster; and
determine a relationship between the pair of adjacent images in the sequence of images and the one or more objects in the pair of adjacent images based on the refined homographies of the best cluster.

17. The computer program product of claim 16, wherein to refine the homographies of the best cluster, the computer readable program causes the computer to:
identify a cluster with a largest number of homographies as the best cluster;
determine a second set of corresponding features associated with homographies included in the best cluster;
identify inliers based on the second set of corresponding features consistently matching in the pair of adjacent images; and
identify the pair of adjacent images as a pair of matching images based on the inliers.

18. The computer program product of claim 16, wherein to determine the relationship between the pair of adjacent images in the sequence of images and the one or more objects in the pair of adjacent images, the computer readable program causes the computer to:
  determine a relationship between the one or more objects in an overlap region between the pair of adjacent images;
  determine a seam in the overlap region between the pair of adjacent images using the relationship between the one or more objects in the overlap region; and
  determine a portion of pixels from each image of the pair of adjacent images to represent in a stitched panoramic image based on the seam.

19. The computer program product of claim 18, wherein to determine the seam in the overlap region between the pair of adjacent images, the computer readable program causes the computer to:
  identify the overlap region between the pair of adjacent images;
  for each adjacent image of the pair, identify the one or more objects within the overlap region, selecting a distinct color value and modifying color values for a set of pixel locations forming a boundary around the one or more objects to the distinct color value;
  for each adjacent image of the pair, identify a color value at each pixel location within the overlap region;
  compute a cost between each pair of adjacent pixel locations in the overlap region as a measure of color similarity; and
  determine the seam that runs between a plurality of pairs of adjacent pixel locations in the overlap region such that a total cost is minimized.

20. The computer program product of claim 18, wherein to determine the seam in the overlap region between the pair of adjacent images, the computer readable program causes the computer to:
  identify the overlap region between the pair of adjacent images;
  identify a plurality of pixel locations within the overlap region for each adjacent image of the pair;
  for each adjacent image of the pair, set a value of an object indicator for the plurality of pixel locations based on whether an object is present at the plurality of pixel locations;
  for each adjacent image of the pair, identify a color value at the plurality of pixel locations;
  compute a cost between each pair of adjacent pixel locations in the plurality of pixel locations within the overlap region as a weighted sum of the object indicator and color similarity; and
  determine the seam that runs between one or more pairs of adjacent pixel locations in the plurality of pixel locations within the overlap region such that a total cost is minimized.

* * * * *